US009674030B2

(12) United States Patent
Murphy et al.

(10) Patent No.: US 9,674,030 B2
(45) Date of Patent: Jun. 6, 2017

(54) METHODS AND APPARATUS FOR A COMMON CONTROL PROTOCOL FOR WIRED AND WIRELESS NODES

(71) Applicant: Juniper Networks, Inc., Sunnyvale, CA (US)

(72) Inventors: James Murphy, Alameda, CA (US); Sandip Shah, Milpitas, CA (US); Abhijit Choudhury, Cupertino, CA (US); Pranay Pogde, Sunnyvale, CA (US); Yung-Ching Tseng, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 637 days.

(21) Appl. No.: 13/630,488

(22) Filed: Sep. 28, 2012

(65) Prior Publication Data
US 2014/0092884 A1    Apr. 3, 2014

(51) Int. Cl.
*H04L 29/06*    (2006.01)
*H04L 12/24*    (2006.01)
(Continued)

(52) U.S. Cl.
CPC .......... *H04L 41/0654* (2013.01); *H04L 41/00* (2013.01); *H04L 41/0806* (2013.01);
(Continued)

(58) Field of Classification Search
CPC ..... H04L 69/03; H04L 41/00; H04L 41/0654; H04L 41/0806; H04W 84/12;
(Continued)

(56) References Cited

U.S. PATENT DOCUMENTS 5,379,278 A    1/1995  Safadi
5,812,531 A    9/1998  Cheung et al.
(Continued)

FOREIGN PATENT DOCUMENTS

CN    1390035 A    1/2003
CN    1689348 A    10/2005
(Continued)

OTHER PUBLICATIONS

Nick McKeown, et al. "OpenFlow: Enabling Innovation in Campus Networks", Mar. 14, 2008.
(Continued)

*Primary Examiner* — Gbemileke J Onamuti
(74) *Attorney, Agent, or Firm* — Cooley LLP

(57) ABSTRACT

In some embodiments, an apparatus comprises of a control module implemented in at least one of a memory or a processing device that is configured to receive, via a network and from a wireless access point or an access network node, a control packet defined based on a control protocol. The control packet is associated with at least one control function of the wireless access point or access network node. The control module is configured to determine a status of an access network node based on the control packet from the access network node. The control module is configured to send via the network, a response to the access network node based on the status of the access network node.

22 Claims, 7 Drawing Sheets

(51) Int. Cl.
*H04W 24/04* (2009.01)
*H04W 72/04* (2009.01)
*H04W 12/06* (2009.01)
*H04W 88/12* (2009.01)
*H04W 84/12* (2009.01)
*H04W 88/14* (2009.01)

(52) U.S. Cl.
CPC ............. *H04L 69/03* (2013.01); *H04W 24/04* (2013.01); *H04W 72/0406* (2013.01); *H04W 12/06* (2013.01); *H04W 84/12* (2013.01); *H04W 88/12* (2013.01); *H04W 88/14* (2013.01)

(58) Field of Classification Search
CPC . H04W 88/12; H04W 24/04; H04W 72/0406; H04W 12/06; H04W 88/028; H04W 88/14
See application file for complete search history.

(56) References Cited

U.S. PATENT DOCUMENTS

| | | | |
|---|---|---|---|
| 6,094,436 A * | 7/2000 | Runaldue | G06F 5/06 370/420 |
| 6,219,546 B1 | 4/2001 | Valentine et al. | |
| 8,036,172 B1 | 10/2011 | Breau | |
| 8,264,947 B1 | 9/2012 | Tavares | |
| 2002/0110105 A1 | 8/2002 | Awater et al. | |
| 2003/0139197 A1 | 7/2003 | Kostic et al. | |
| 2003/0154431 A1 | 8/2003 | Lin et al. | |
| 2003/0174690 A1 | 9/2003 | Benveniste | |
| 2004/0052248 A1* | 3/2004 | Frank et al. | 370/352 |
| 2004/0081140 A1* | 4/2004 | Martin | G01S 5/0252 370/352 |
| 2006/0056448 A1* | 3/2006 | Zaki | H04W 36/0066 370/466 |
| 2007/0064673 A1 | 3/2007 | Bhandaru et al. | |
| 2007/0116020 A1 | 5/2007 | Cheever et al. | |
| 2007/0220553 A1 | 9/2007 | Branam et al. | |
| 2007/0253328 A1 | 11/2007 | Harper et al. | |
| 2008/0162981 A1 | 7/2008 | Jajoo et al. | |
| 2008/0225853 A1* | 9/2008 | Melman et al. | 370/392 |
| 2009/0034470 A1 | 2/2009 | Nagarajan et al. | |
| 2010/0220656 A1 | 9/2010 | Ramankutty et al. | |
| 2010/0246545 A1* | 9/2010 | Berzin | 370/338 |
| 2011/0235505 A1 | 9/2011 | Eswara et al. | |
| 2011/0319073 A1 | 12/2011 | Ekici et al. | |
| 2012/0106320 A1* | 5/2012 | Moisiadis et al. | 370/217 |
| 2012/0236708 A1 | 9/2012 | Kompella et al. | |
| 2012/0287774 A1* | 11/2012 | Hinkle et al. | 370/216 |
| 2013/0083724 A1 | 4/2013 | Sindhu et al. | |
| 2013/0343178 A1 | 12/2013 | Ankaiah et al. | |
| 2014/0006481 A1* | 1/2014 | Frey | H04L 41/0246 709/203 |
| 2014/0092723 A1 | 4/2014 | Murphy et al. | |
| 2014/0092884 A1 | 4/2014 | Murphy et al. | |

FOREIGN PATENT DOCUMENTS

| | | |
|---|---|---|
| CN | 101051981 A | 10/2007 |
| CN | 102143604 | 8/2011 |
| CN | 102439914 A | 5/2012 |
| EP | 1 777 893 | 4/2007 |
| EP | 2725829 A2 | 4/2014 |
| WO | 0251078 A2 | 6/2002 |
| WO | 2004028175 A1 | 4/2004 |
| WO | WO 2009/158263 | 12/2009 |

OTHER PUBLICATIONS

HiveManager, "My HiveAPs are connected by CAPWAP, but why is their connection status shown as disconnected?" Retrieved from the internet, https://faq.aerohive.com/index.php?action—artikel&cat=3&id=348&artlang=en, Nov. 23, 2010, 1 page.

Enterprise Mobility 4.1 Design Guide, "Cisco Unified Wireless QoS", Cisco Systems, Inc. Dec. 9, 2008, Chapter 5, pp. 5-1-5-32.

Jason Edelman (@jedelman8), "CAPWAP and OpenFlow—thinking outside the box", Retrieved from the internet, http://www.jedelman.com/1/post/2011/12/capwap-and-openflow-thinking-outside-the-box.html, Nov. 30, 2011, 3 pages.

Muhammad Arif Amin, "Handover Latency Measurement using Variant of Capwap Protocol", Macrothink Institute, Network Protocols and Algorithms, ISSN 1943-3581, vol. 3, No. 2. (2011).

Michael Montemurro, "Re: Multiple/Redundant AC's (was: Re: [Capwap] Additional Comment on LWAPP)", Retrieved from the internet, http://lists/frascone.com/pipermail/capwap/msg02197.html. Jan. 25, 2006, 3 pages.

George C. Hadjichristofi, et al. "A Wired-Wireless Testbed Architecture for Network Layer Experimentation Based on ORBIT and VINI", WiNTECH '07, Sep. 10, 2007. pp. 83-90.

Partial European Search report dated Apr. 3, 2014 for European Application No. 13165000.4-1854, 6 pages.

Office Action including Search Report, issued on Jul. 6, 2016, by the State Intellectual Property Office of People's Republic of China for corresponding Chinese Patent Application No. 201310159620.5, filed Apr. 22, 2013.

Extended EP Search Report dated Oct. 10, 2014 for European Application No. 13165614.

P. Calhoun, Ed., Control and Provisioning of Wireless Access Points (CAPWAP) Protocol Specification, Mar. 2009, pp. 1-155, Aruba Networks.

Chinese First Office Action dated Jun. 7, 2016; for Application No. 2013101596205.

Office Action in U.S. Appl. No. 13/630,470 dated May 7, 2014.

Office Action in U.S. Appl. No. 13/630,470 dated Aug. 25, 2014.

Chinese First Office Action dated May 24, 2016; for Application No. 2013101636236.

L. Yang, et al., Architecture Taxonomy for Control and Provisioning of Wireless Access Points (CAPWAP), Network Working Group, RFC 4118, Jun. 2005, pp. 1-41.

Office Action in U.S. Appl. No. 14/978,805 dated Jun. 28, 2016.

* cited by examiner

US 9,674,030 B2

METHODS AND APPARATUS FOR A COMMON CONTROL PROTOCOL FOR WIRED AND WIRELESS NODES

CROSS-REFERENCE TO RELATED APPLICATIONS

This application is related to co-pending U.S. patent application Ser. No. 13/630,470, filed on the same date herewith, and entitled "Methods and Apparatus for Controlling Wireless Access Points," which is incorporated herein by reference in its entirety.

BACKGROUND

Some embodiments described herein relate generally to using a common control protocol to manage wireless and wired devices, and, in particular, to methods and apparatus for using a common control protocol such as the Control and Provisioning of Wireless Access Points (CAPWAP) protocol to manage wireless Institute of Electrical and Electronics Engineers (IEEE) 802.11 and wired (IEEE 802.3) devices in an enterprise network architecture.

Known enterprise networks use separate control protocols for managing and/or controlling wireless devices on the one hand and wired network devices on the other hand. The use of separate protocols typically involves increased computational resources to translate control and data packets between one protocol and the other protocol. This can lead lower efficiency of the enterprise network.

Accordingly, a need exists for the use of a single control protocol for managing network sessions, network nodes and data tunneling functions in both wireless and wired network devices in an enterprise network.

SUMMARY

In some embodiments, an apparatus comprises of a control module implemented in at least one of a memory or a processing device that is configured to receive, via a network and from a wireless access point or an access network node, a control packet defined based on a control protocol. The control packet is associated with at least one control function of the wireless access point or access network node. The control module is configured to determine a status of an access network node based on the control packet from the access network node. The control module is configured to send via the network, a response to the access network node based on the status of the access network node.

DETAILED DESCRIPTION

Figure 1:
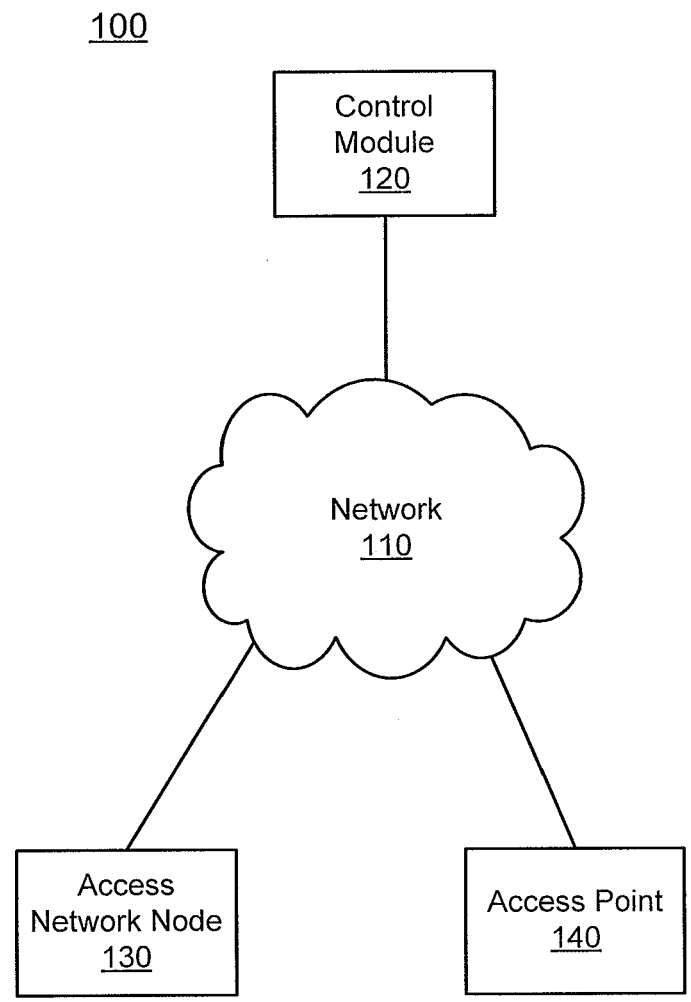
FIG. 1 is a schematic illustration of a system for implementing a common control protocol for wired and wireless nodes, according to an embodiment.

In some embodiments, an apparatus includes a control module implemented in at least one of a memory or a processing device. The control module is configured to receive a control packet, via a network and from a wireless access point that operatively couples a first client device to the network via a wireless link. The control packet is defined based on a control protocol such as, for example, a Control And Provisioning of Wireless Access Points (CAPWAP) protocol. The control packet is associated with at least one control function of the wireless access point. The control function of the wireless access point can include, for example, at least one of node management of the wireless access point, session management of the wireless access point, or radio frequency (RF) management of the wireless access point. RF management can include, for example, management of the different radio channels or ports of the wireless access point. The control module is also configured to receive a control packet, via a network and from an access network node that operatively couples a second client device to the network via a wired link. The control packet is defined based on a control protocol such as, for example, a CAPWAP protocol. The control packet is associated with at least one control function of the access network node. The control function of the access network node can include, for example, at least one of node management of the access network node, session management of the access network node, or route management of the access network node. The control module is configured to determine a status of the access network node based on the control packet from the access network node and send via the network, a response to the access network node based on the status of the access network node.

In some embodiments, a non-transitory processor-readable medium includes code representing instructions to cause a processor to receive at a control module and via a network and from a wireless access point, a configuration status request message defined based on a control protocol. The code can also cause the processor to receive at the control module and via a network and from an access network node, a configuration status request message defined based on a control protocol. The code can cause the processor to determine based on the configuration status request received from the wireless access point, a status of the wireless access point. The code can also cause the processor to determine based on the configuration status request received from the access network node, a status of the access network node. The code further can cause the processor to send based on the status of the wireless access point, a configuration status response message to the wireless access point. The code further can cause the processor to send based on the status of the access network node, a configuration status response message to the access network node.

In some embodiments, an apparatus comprises of an access network node configured to operatively couple a client device to a network via a wired link. In such embodiments, the access network node is configured to send a CAPWAP protocol discovery message to a CAPWAP control module via the network. In response to the CAPWAP protocol discovery request message, the access network node is configured to receive from the CAPWAP control module, a CAPWAP discovery control message. The access network node is configured to establish, in response to the CAPWAP discovery message, a control channel with the CAPWAP control module.

FIG. 1 is a schematic illustration of a system for implementing a common control protocol for wired and wireless nodes, according to an embodiment. The system 100 includes a control module 120, a network 110, an access network node 130, and an access point 140.

The network 110 can be any type of network (e.g., a local area network (LAN), a wide area network (WAN), a virtual network, and a telecommunications network) implemented as a wired network and/or wireless network. As described in further detail herein, in some embodiments, for example, the access network node 130 and access point 140 can be connected to the control module 120 via an intranet, an Internet Service Provider (ISP) and the Internet, a cellular network (e.g., network 110), and/or the like.

The access network node 130 can be any device that can directly connect one or more wired client devices to the network 110 via a wired link and can be, for example, a hub, an Ethernet switch, etc. In some cases, the access network node 130 is also known as an access switch, a network switch, or a switching hub. The access network node 130 can be configured to send a Control And Provisioning of Wireless Access Points (CAPWAP) protocol discovery request message to the control module 120 via the network 110. The access network node 130 is configured to receive, from the control module 120 and in response to the CAPWAP protocol discovery request message, a CAPWAP discovery response message. The access network node 130 is configured to establish, in response to the CAPWAP discovery response message, a control channel with the control module 120.

Furthermore, as described in detail herein, access network node 130 is configured to ensure packets are delivered between one or more wired host devices, and/or one or more access points that are coupled to the access network node 130. A wired client device can be, for example, any device that can receive packets from and/or send packets to an access network node through a wired connection, such as a desktop computer, a laptop computer, a workstation, a printer, etc.

The access point 140 can be any device that connects a wireless client device to a wired network 110 using, for example, Wireless Fidelity (Wi-Fi), Bluetooth or other wireless communication standards. In some cases, the access point 140 can be located on the same device together with an access network node 130, such as a wireless Ethernet router equipped with a wireless transceiver. In other cases, the access point 140 can be a stand-alone device, such as a wireless access point (WAP) or a Wireless Termination Point (WTP). Similar to a wired client device, a wireless client device can be, for example, any device that can receive packets from and/or send packets to an access point 140 through a wireless connection, such as, for example, a mobile phone, a Wi-Fi enabled laptop, a Bluetooth earphone, etc.

The control module 120 can be a hardware module or a software module that can be implemented in at least one of a memory or a processing device of a compute device such as, for example, a server, a workstation, a desktop computer, a laptop computer, and/or so forth. The control module 120 can be, for example, a Control and Provisioning of Wireless Access Points (CAPWAP) access controller (AC) or a CAPWAP control module that can manage a collection of access network nodes 130 and access points 140 (i.e., Wireless Termination Points (WTPs)) in an enterprise network.

The control module 120 is configured to receive a control packet via the network 110 and from the (wireless) access point 140 that operatively couples a first (wireless) client device to the network 110 via a wireless link. The control packet can be defined based on a first CAPWAP protocol binding (control protocol), and is associated with at least one control function of the wireless access point 140. The control function of the wireless access point 140 can include, for example, at least one of node management of the wireless access point 140, session management of the wireless access point 140, or radio frequency (RF) management of the wireless access point 140. Node management can include, for example, image management, state management, configuration of the network node, and/or so forth. Session management can include, for example, applying a specific policy to a session or a user, authentication and authorization, and/or so forth. RF management can include, for example, management of the different radio channels or ports of the wireless access point 140. The control module 120 is also configured to receive from the access network node 130 via the network 110 a control packet that is defined based on a second CAPWAP protocol binding (the second CAPWAP protocol binding is different than the first CAPWAP protocol binding), where the access network node 130 operatively couples a second client device to the network 110 via a wired link. This control packet is associated with at least one control function of the access network node 130. The control function of the access network node 130 can include at least one of node management of the access network node 130, session management of the access network node 130, or route management of the access network node 130.

The control module 120 is configured to determine a status (e.g., configuration status) of the access network node 130 based on the control packet received from the access network node 130 and send via the network 110, a response message (e.g., a configuration status response message) to the access network node 130 based on the status of the access network node 130. The control module is also configured to determine a status (e.g., configuration status) of the (wireless) access point 140 based on the control packet received from the access point 140 and send via the network 110, a response message (e.g., a configuration status response message) to the (wireless) access point 140 based on the status of the access point 140.

In some instances, the control packet received by the control module 120 from the (wireless) access point 140 can be an authentication request associated with the first (wireless) client device. In such instances, the control module 120 is configured to authenticate the first client device and send a response message to the access point 140 after authenticating the first client device such that the access point 140 can implement a policy associated with the first client device.

In other instances, the control packet received by the control module 120 from the (wired) access network node 130 can be an authentication request associated with the second (wired) client device. In such instances, the control module 120 is configured to authenticate the second client device and send a response message to the access network node 130 after authenticating the second client device such that the access network node 130 can implement a policy associated with the second client device.

One of the advantages for using a single controller to implement a control protocol such as the CAPWAP protocol to manage both wired and wireless nodes/devices is that the single controller can allow for the reuse of the implementation of the basic node and session management functions from the base CAPWAP protocol. An additional advantage is that that the single controller can allow wireless Institute of Electrical and Electronics Engineers (IEEE) 802.11 and wired (IEEE 802.3) access networks to share a common protocol and its associated paradigms, which can result in increased consistency for implementers and users in developing converged wired/wireless networking solutions.

Figure 2A:
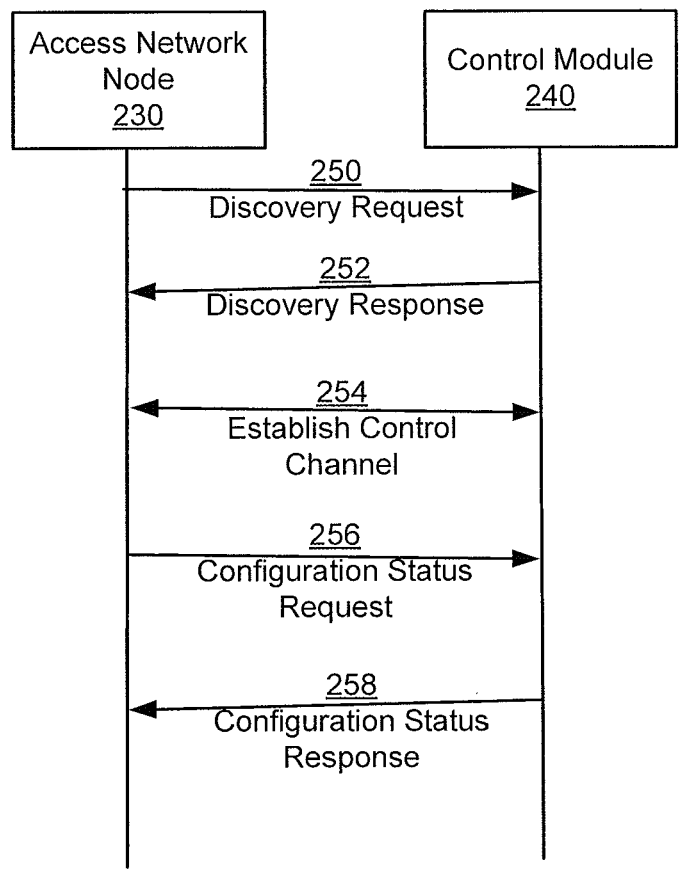
FIG. 2A is a message flow diagram between a control module and an access network node, according to an embodiment.

FIG. 2A is a message flow diagram illustrating a method for a control module to implement the CAPWAP protocol to provide control functions for an access network node when the access network node joins an enterprise network, according to an embodiment. The method 200 includes managing one or more access network nodes 230. As shown in FIG. 2A, the access network node 230 sends a discovery request message to the control module 240 as a User Datagram Protocol (UDP) packet via the network (e.g., network 110 in FIG. 1), at 250. For example, a discovery request message can be used by an access network node 230 at the beginning of each CAPWAP session to automatically discover in a network potential control module(s) 240 that can provide control services to the access network node 230, and also determine the capabilities and workload of the control module 240. The discovery request message can provide the control module 240 with information associated with the primary capabilities of the access network node 230. Access network node 230 can exchange this information so that subsequent exchanges with the control module 240 can be consistent with the access network node's 230 functional characteristics.

The discovery request message can be composed, for example, of multiple portions. Such portions can include, for example, information associated with the port of the access network node 230 via which the client device (such as client device 210 shown in FIG. 2B) is operatively coupled to the network. Such information can include a port identifier, the power-over-Ethernet capability of the port, the speed of the port, and/or so forth.

In some instances, the discovery request message can include an additional portion, for example, regarding the discovery type. The discovery type portion can include, for example, a numerical value (that can be composed of any number of bits) indicating the method used by the access network node 230 to discover the existence of the control module 240 to which the access network node 230 is sending the discovery request message. Examples of such methods can include Dynamic Host Configuration Protocol (DHCP) configuration, static configuration, domain name system (DNS), and/or so forth.

In some instances, another portion of the discovery request message can include, for example, the access network node 230 board data. This portion can contain, for example, a vendor identifier associated with the manufacturer of the access network node 230, the access network node 230 model number, the access network node 230 serial number, the access network node 230 hardware identifier, the access network node 230 media access control (MAC) address, the access network node 230 maximum transmission unit (MTU), and/or so forth.

In some instances, another portion of the discovery request message can include, for example, the access network node 230 descriptor. The access network node 230 descriptor portion of the discovery message request can be used by the access network node 230 to communicate its current hardware and software configuration to the control module 240 such as, for example, the hardware version of the access network node 230, the version of the software being used by the access network node 230, data encryption capabilities of the access network node 230, the CAPWAP protocol binding identifier used by the access network node 230, and/or so forth.

In some instances, another portion of the discovery request message can indicate, for example, the access network node 230 frame tunnel mode. The access network node 230 frame tunnel mode portion of the discovery message request 250 allows the access network node 230 to communicate the tunneling modes of operation that access network node 230 supports to the control module 240. An access network node 230 that advertises support for multiple types of tunnels can allow the control module 240 to select which type will be used, based on its local policy. Examples of frame tunneling modes can include native frame tunnel mode, the IEEE 802.3 frame tunnel mode, local bridging, and/or so forth.

The discovery request message can also include, for example, the access network node 230 maximum transmission unit (MTU) discovery portion. The MTU discovery message portion can be used to perform MTU discovery for the specific CAPWAP protocol binding used. The MTU of a communications protocol in a layer is the size (in bytes) of the largest protocol data unit that the layer can pass. A larger MTU can bring greater efficiency because each packet can carry more user data while protocol overheads, such as headers or underlying per-packet delays, remain fixed. The resulting higher efficiency can result in an improvement in bulk protocol throughput. A larger MTU can also lead to processing of fewer packets for the same amount of data. This can be desirable because in some systems, per-packet-processing can be a critical performance limitation.

At 252 of FIG. 2A, the control module 240 sends a discovery response message to the access network node 230 in response to the discovery request message via the network (e.g., network 110 in FIG. 1). The discovery response message is sent by the control module 240 when in the idle state, and provides a mechanism for the control module 240 to advertise its services and capabilities to the requesting access network node 230. In some instances, the control module 240 may include in the discovery response message indicators for only the CAPWAP protocol bindings shared in common with the access network node 230. In other instances, the control module 240 can also include a list of indicators of all of the CAPWAP protocol bindings supported by the control module 240 in the discovery response message.

In some instances, the discovery response message can also be composed of multiple portions. Such portions can include, for example, a control module 240 descriptor portion. The control module 240 descriptor portion can be used by the control module 240 to communicate its current state such as, for example, the number of access network nodes 230 currently managed by the control module 240, the maximum number of access network nodes 230 that can be managed by the control module 240, the number of (wireless) access points currently managed by the control module 240, the maximum number of (wireless) access points that can be managed by the control module 240, the total number of access devices (access network nodes+access points) that can be managed by the control module 240 using the CAPWAP protocol, the policy on the use of Datagram Transport Layer Security (DTLS) for CAPWAP control channels, a control module 240 vendor identifier, the hardware version of the control module 240, the version of the software running on the control module 240, and/or so forth.

In some instances, another portion of the discovery response message can be, for example, the control module 240 name portion. The control module 240 name portion can contain, for example, a Universal Character Set Transformation Format-8-bit (UTF-8) representation of the control module 240 identity. In some instances, the identity can also be represented by a variable-length byte string.

In some instances, other portions of the discovery response message can be, for example, the CAPWAP Control Internet Protocol version 4 (IPv4) address portion, and the CAPWAP Control Internet Protocol version 6 (IPv6) address portion. The CAPWAP Control IPv4 address message portion is sent by the control module 240 to the access network node 230 during the discovery process and is used by the control module 240 to provide information about the different interfaces available on the control module 240 executing the IPv4 standard, and the current number of access network nodes 230 connected to each interface. The CAPWAP Control IPv6 address message portion is used by the control module 240 to provide information about the different interfaces available on the control module 240 executing the IPv6 standard, and the current number of access network node(s) 230 connected to each interface. During the discovery process, a control module 240 may return more than one CAPWAP Control IPv4 address or CAPWAP Control IPv6 address message portions in the discovery response message at 252. When more than one such message portion is returned, the access network node 230 may be able to perform "load balancing" by choosing the interface that is servicing the least number of access network node(s) 230.

At 254, on receiving the discovery response message from the control module 240, the access network node 230 can establish a control channel such as, for example, a CAPWAP control channel with the control module 240. This CAPWAP control channel can be used for a network session between the control module 240 and the access network node 230.

After establishment of the control channel between the access network node 230 and the control module 240, a configuration status request message can be sent by the access network node 230 to the control module 240 to deliver the current configuration information of the access network node 230 to the control module, at 256. The configuration status request message can carry CAPWAP protocol binding (for wired devices) message portions. In some embodiments, the configuration status request message can include multiple portions (components). Such portions can include, for example, the port identifier associated with a port of the access network node 230 that is connected to the control module 240, an indication of a port speed of the port, an indication of a power-over-Ethernet capability of the port, the control module 240 name, and/or so forth.

In some instances, another portion of the configuration status request message can be, for example, the access network node 230 reboot statistics. The access network node 230 reboot statistics message portion is sent by the access network node 230 to the control module 240 to communicate the reasons for reboots and track the number of times access network node 230 reboots have occurred. For example, access network node 230 reboot statistics message portion can track the number of times a CAPWAP-based connection with a control module 240 has failed due to link failure, software failure, hardware failure, unknown cause of failure, and/or so forth.

In some instances, another portion of the configuration status request message can be, for example, the access network node 230 static IP address information. The access network node 230 static IP address information portion can be used by the control module 240 to configure or clear a previously configured static IP address on the access network node 230. In some instances, such as when using the IPv6 standard, access network node 230 can be expected to use dynamic IP addresses.

Upon receiving the configuration status request message, the control module 240 can act upon the content of the message and respond to the access network node 230 with a configuration status response message, at 258. The configuration status response message is sent by the control module 240 and in some instances, can provide a mechanism for the control module 240 to override the requested configuration by the access network node 230. The configuration status response message can carry CAPWAP protocol binding-specific message portions.

In some instances, the configuration status response message can also be comprised of multiple portions (components). Such portions can include, for example, the CAPWAP timer portion, the access network node 230 fall back portion, the control module 240 IPv4 list portion, the control module 240 IPv6 list portion, and/or so forth.

The CAPWAP timer message portion can be used by the control module 240 to configure CAPWAP timers included in or controlled by an access network node 230. The CAPWAP timer message portion can, for example, specify the number of seconds between CAPWAP discovery messages, when the access network node 230 is in the discovery phase. This value can be used to configure the maximum time allowed between sending individual discovery request messages.

The access network node 230 fallback portion can be sent by the control module 240 to the access network node 230 to enable or disable automatic CAPWAP fallback in the event the access network node 230 detects it is not connected currently to the designated control module 240. The access network node 230 fallback portion can be, for example, an 8-bit (or any number of bits) value that can indicate the status of automatic CAPWAP fallback on the access network node 230. In some embodiments with multiple control module(s) 240, when the automatic CAPWAP fallback is enabled, if the access network node 230 detects that its primary control module 240 is available, and that the access network node 230 is not connected to the primary control module 240, the access network node 230 can automatically disconnect from its current control module and reconnect to its primary control module 240. If disabled, the access network node 230 can reconnect to its primary control module 240 through, for example, manual intervention and not automatically.

The control module 240 IPv4 list message portion and the control module 240 IPv6 list message portion are used to provide the access network node 230 with the latest list of control module(s) 240 available for the access network node 230 to join. These message portions can include an array of, for example, 32-bit integers containing control module IPv4 addresses or an array of 128-bit integers containing control module IPv6 addresses.

Figure 2B:
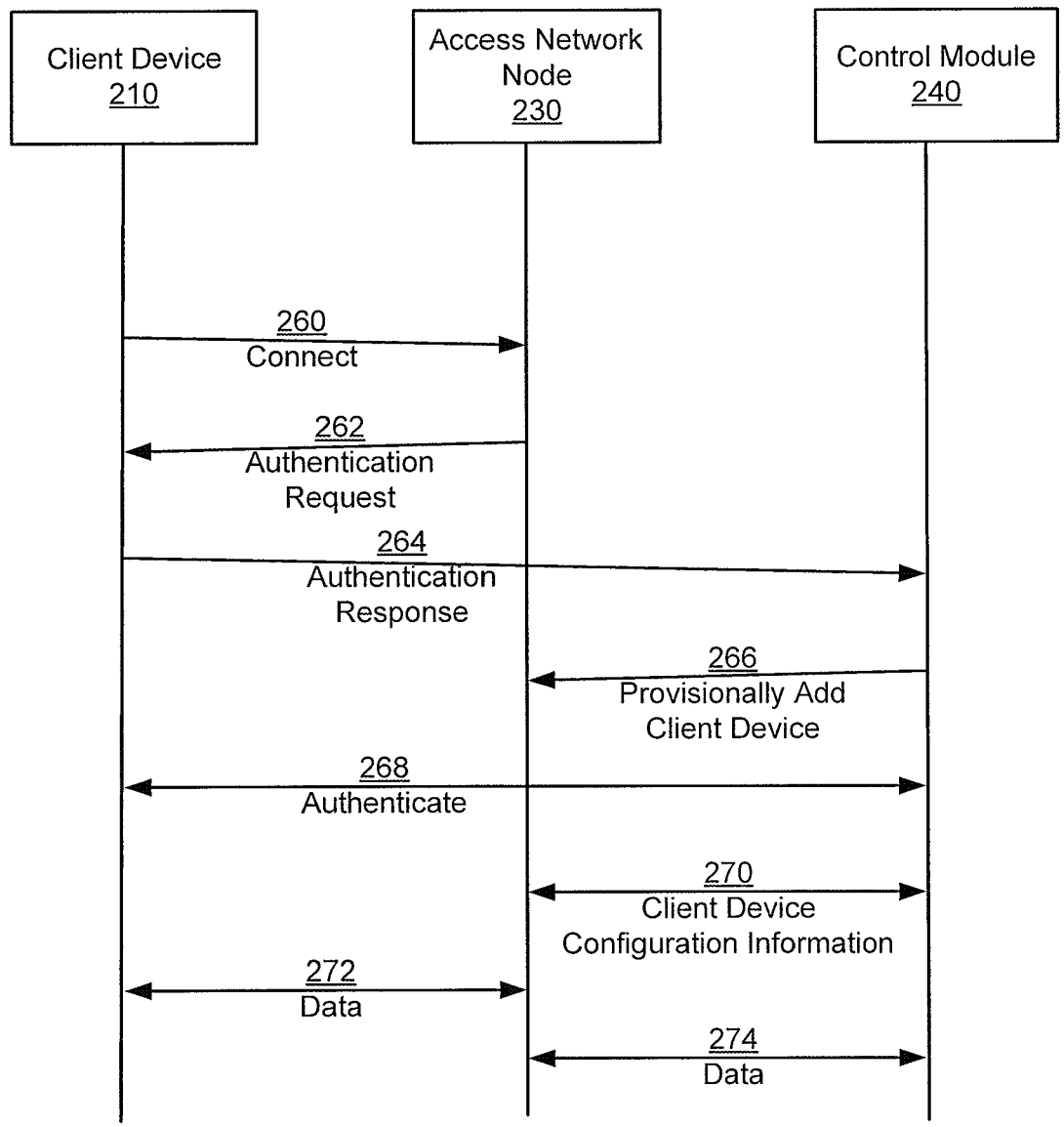
FIG. 2B is a message flow diagram illustrating a method for a control module to implement the CAPWAP protocol to authenticate a client device, according to an embodiment.

FIG. 2B is a message flow diagram illustrating a method for a control module to implement the CAPWAP protocol to authenticate a client device and add the client device to an enterprise network, according to an embodiment. The method 201 includes a client device 210 connecting to the access network node 230, at 260. The connection can be, for example, a physical wired connection made between the client device 210 and the access network node 230 by various types of copper and/or fiber cables between an IEEE 802.3 Ethernet port on the client device 210 and a specific port on the access network node 230.

When a new client device 210 is detected by the access network node 230, the port on the access network node 230 connected to the client device 210 is enabled and can be set to the "unauthorized" state by the control module 240, such that only IEEE 802.1x traffic (or control frames) from the client device 210 is allowed. Other formats of traffic, such as DHCP and Hypertext Transfer Protocol (HTTP) traffic is disallowed or dropped. IEEE 802.1x is the IEEE Standard for port-based Network Access Control (PNAC) and is part of the IEEE 802.1 group of networking protocols that provides an authentication mechanism to devices connecting to a local area network (LAN) or a wireless local area network (WLAN). IEEE 802.1x defines the encapsulation of the Extensible Authentication Protocol (EAP), which is an authentication framework frequently used in wireless networks and wired point-to-point connections.

On connection with the client device 210, the access network node 230 can send periodic authentication request messages (signals) to the client device 210, at 262. The authentication request messages can be, for example, periodic EAP request frames. In some embodiments, the authentication request message can include, for example, an address of the access network node 230, an address of the client device 210, an address of the control module 240, a reference to a time frame for which the request will be valid, an identifier associated with the access network node 230, and/or the like.

After receiving the authentication request signal, the client device 210 can generate an authentication response message and send it to the control module 240 over, for example, the CAPWAP control channel or a CAPWAP data channel, at 264. While some implementations of the method for a (CAPWAP) control module 240 to use the CAPWAP protocol to provide control functions for an access network node 230 and to authenticate a client device 210 carry the (client device) authentication messages over the CAPWAP control channel, other implementations carry the (client device) authentication messages over a CAPWAP data channel. The latter implementation uses the CAPWAP control channel for communication between the access network node 230 and the control module 240, and a CAPWAP data channel for communication between the client device 210 and the control module 240.

The authentication response message can be, for example, an EAP-response identity packet (or frame). The authentication response message can include, for example, an identifier unique to the client device 210 (a device ID number), a device hardware model number, a device manufacturer identifier, the version of the software running on the client device 210, the data encryption/decryption methods supported by the client device 210, and/or the like.

After receiving the authentication response signal, the control module 240 can send a signal to the access network node 230 that includes an indication (that can include an identifier of the client device 210) to provisionally add the client device 210 to the access network node 230, at 266.

The control module 240 can send the provisionally add-client-device signal to the access network node 230 via, for example, the CAPWAP control channel. This provisionally add-client-device signal informs the access network node 230 that the control module 240 will be sending control packets to the client device 210, but the port in the access network node 230 connected to the client device 210 is also instructed to continue to restrict the client device 210 to exchange IEEE 802.1x traffic only. This limits the data traffic flow to authentication exchanges only (e.g., EAP messages).

Although not shown in FIG. 2B, the control module 240 can send an EAP-Request message to the access network node 230, specifying the type of EAP-based authentication method the control module 240 can direct the client device 210 to implement. The access network node 230 can transmit the EAP-Request message to the client device 210. The client device 210 can start using the requested EAP method, or send a negative acknowledgement message (a NAK message). The client device 210 can also further respond with the EAP-Response message that can contain information about the different EAP methods the client device 210 can implement.

After the control module 240 and the client device 210 have exchanged signals to select an EAP method, the control module 240 can authenticate the client device 210 via the IEEE 802.1x standard, at 268. EAP-Request and EAP-Response messages are sent between the client device 210 and the control module 240 (the EAP messages may be encapsulated and/or decapsulated by the access network module 230) until the control module 240 responds with, for example, either an EAP-Success message, or an EAP-Failure message. If authentication is successful, the control module 240 can send a signal such that the port on the access network node 230 that is connected to the client device 210 is set to the "authorized" state, whereby additional traffic (e.g., in addition to control signals) can be allowed to flow though. In some instances when the client device 210 logs off, an EAP-logoff message can be sent from the client device 210 to the control module 240. In such instances, the control module 240 can send a signal such that the port on the access network node 230 that is connected to the client device 210 is set to the "unauthorized" state. This again can block all non-EAP traffic. If the authentication is unsuccessful, the port on the access network node 230 that is connected to the client device 210 remains in the "unauthorized" state.

After successful authentication, the control module 240 generates and sends messages or signals (such as an EAP-Request message) to the access network node 230 requesting client device 210 configuration information, at 270. The configuration information requested can be, for example, the client device 210 MAC address, a VLAN identifier, the hardware version of the client device 210, the version of the software being used by the client device 210, data encryption capabilities of the client device 210, the CAPWAP binding protocol identifier used by the client device 210, and/or so forth. Upon receiving a response message (such as an EAP-Response message) from the access network node 230 that provides the requested client device 210 configuration information, the control module 240 can admit the client device 210 into a VLAN and can apply the client device 210 specific VLAN policy.

After the client device 210 is successfully admitted into and associated with a VLAN, the client device 210 can exchange various kinds of data with the access network node 230, at 272. Examples of data exchanged can include data associated with power-over-Ethernet capability of the port of the access network node 230 that is connected to the client device 210, textual data, image data, voice data, video data, and/or any other kind of IEEE 802.3 based data that can be sent from and/or received by the client device 210 via a tunnel or local switches as per the VLAN policy implemented. In some embodiments, data can also be exchanged between the access network node 230 and the control module 240, at 274. In such embodiments, the data exchanged between the client device 210 and the access network node 230 can be sent to and/or received from the control module 274.

CAPWAP is used as an example of a control protocol to manage wireless and wired network nodes and devices because the base CAPWAP protocol as defined in RFC 5414 provides a foundation for supporting session management, node management, RF management, and data tunneling functions. Moreover, protocol specific bindings can be applied to the base CAPWAP protocol to support specific protocols such as a binding for IEEE 802.3 Ethernet (wired) network nodes as described herein that includes: (i) specifications for binding to the base protocol; (ii) provisions for access port configuration including power-over-Ethernet; (iii) provisions for access port statistics and operational state gathering; (iv) session management functions for media access control (MAC) based authentication and authorization; (v) port configuration for session policy and VLAN assignment; (vi) Spanning Tree Protocol (STP) configuration parameters; (vii) route management, and (viii) other similar networking functions.

Figure 3:
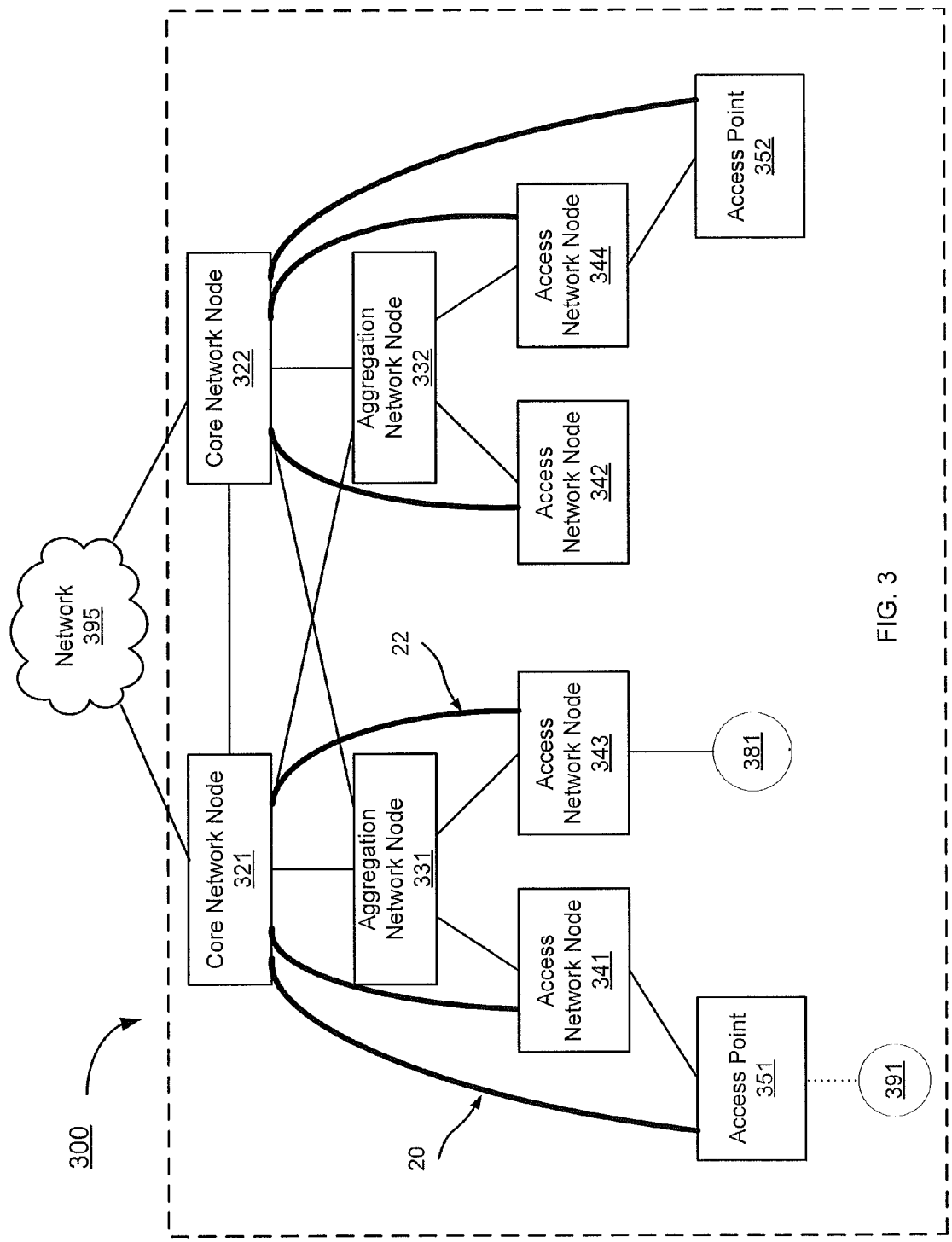
FIG. 3 is a schematic illustration of a homogeneous enterprise network that implements a common control protocol for wired and wireless nodes, according to an embodiment.

CAPWAP Control modules (or CAPWAP controllers) that can use CAPWAP protocols to manage both wireless (e.g., via a first CAPWAP protocol binding) and wired devices (e.g., via a second CAPWAP protocol binding) along with such wireless and wired devices can be implemented in a variety of enterprise network configurations such as, for example, a homogeneous enterprise network as shown in FIG. 3. FIG. 3 is a schematic illustration of a homogeneous enterprise network having (wireless) access points, (wired) access network nodes, aggregation network nodes, and core network nodes that can each include one or more CAPWAP control modules implementing a common control CAPWAP protocol for managing wired and wireless network nodes, according to an embodiment. The homogeneous enterprise network 300 is described in detail in U.S. patent application Ser. No. 13/252,852 filed on Oct. 4, 2011, and entitled "Methods and Apparatus for a Converged Wired/Wireless Enterprise Network Architecture", the disclosure of which is incorporated herein by reference in its entirety.

In an enterprise network where every network device included in the enterprise network or a portion of the enterprise network can be controlled by one or more core network nodes, then that enterprise network can be referred to as a homogeneous enterprise network, or that portion of the enterprise network can be referred to as a homogeneous portion of the enterprise network. In such a homogeneous network or a portion of a homogeneous network, a common tunneling technology can be used to forward both wired traffic and wireless traffic (e.g., data packets and/or control packets) in any portion of the homogeneous enterprise network. For example, as described in detail herein, a Multiprotocol Label Switching (MPLS) tunnel, and/or an Ethernet-over-layer-3 tunnel such as a CAPWAP tunnel can be used to forward both the wired traffic and the wireless traffic (e.g., data packets and/or control packets) in any portion of the homogeneous enterprise network 300.

The homogeneous enterprise network 300 shown in FIG. 3 includes (wireless) access points (e.g., access point 351, access point 352), access network nodes (e.g., access network node 341-344), aggregation network nodes (e.g., aggregation network node 331, aggregation network node 332), and core network nodes (e.g., core network node 321, core network node 322). The core network nodes 321-322 can implement the control module discussed above (e.g., control module 120 in FIG. 1 and control module 240 in FIG. 2), and can manage and/or control both the wireless network nodes (devices) as well as the wired network nodes (devices) using a common CAPWAP protocol.

Figure 6:
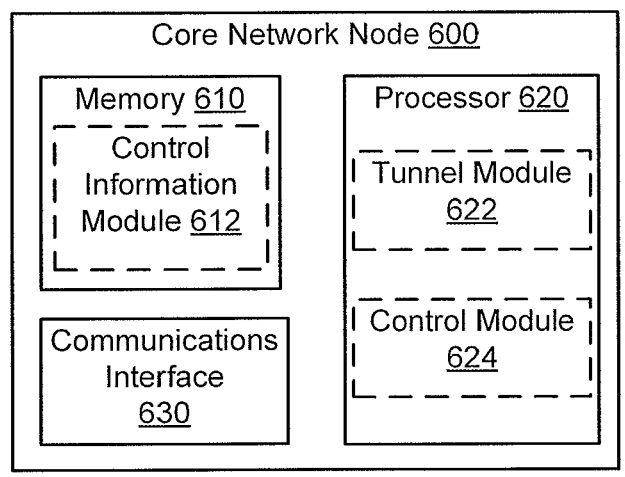
FIG. 6 is a system block diagram of a core network node, according to an embodiment.

The core network node 321 or 322 in a homogeneous enterprise network is a single device that combines, for example, a switch, a router, and a controller, and that includes a control module (e.g., the control module 120 in FIG. 1, the control module 240 in FIG. 2, the control module 624 for core network node 600 as shown in FIG. 6) configured to manage wired/wireless network nodes and/or wired/wireless user sessions using, for example, a common CAPWAP protocol. Core network node (321 and/or 322) is also able to forward packets of wired sessions between an aggregation network node and a network 395 that is operatively coupled to core network node (321 and/or 322). Network 395 can be a network coupled to the homogeneous enterprise network 300 through core network node 321 and/or core network node 322. Network 395 provides access to data resources, applications, and/or information services, to client devices that are operatively coupled to the homogeneous enterprise network 300. For example, network 395 can be a data center network, a wide area network (WAN), the internet, etc. Note that in some configurations of a homogeneous enterprise network, the controller (that includes the CAPWAP control module described above) can be physically and/or logically separate from the core network node 321 or 322. For example, the controller can be located within a device separate and distinct from the core network node 321 or 322, but operatively coupled to the core network node 321 or 322.

Additionally, core network nodes 321 and 322 can establish and maintain a wired session with an access network node (341-344), or establish and maintain a wireless session with an access point (351-352), through intervening wired network nodes, via a tunnel (e.g., a MPLS tunnel, an Ethernet-over-layer-3 tunnel such as a CAPWAP tunnel) that can pass both control packets and/or data packets. Examples of control packets passing via a tunnel between the core network node 321 and access network nodes 341, 343, and access point 351 can include, for example, CAPWAP discovery request messages, CAPWAP discovery response messages, CAPWAP authentication response messages, CAPWAP configuration status request messages, CAPWAP configuration status response messages, and/or the like. Details on tunneling of session data between a core network node and an access network node and/or an access point within a homogeneous enterprise network are described below.

Similar to core network nodes 321-322, all other devices in the homogeneous enterprise network 300, including aggregation network node 331-332, access network node 341-344, and access point 351-352, can be configured to operate in a homogeneous enterprise network. Specifically, the functionality of access network node 341-344 and aggregation network node 331-332 includes multiplexing client traffic, including data and control packets of wired and wireless sessions, to core network node 321 or core network node 322 without any need for local switching or complex forwarding and classification functionality. For example, aggregation network node 331 does not need to be configured to switch or route a (data and/or control) packet received from access network node 343 to another access network node based on a destination address included in the (data and/or control) packet. Instead, aggregation network node 231 can be configured to forward the (data and/or control) packet, through a portion of a tunnel between access network node 343 and core network node 321 (shown as the tunnel represented by 22 in FIG. 3), to core network node 321, where the packet is further switched or routed to the destination device. Similarly stated, access network nodes 341-344 are configured to transmit wired traffic to core network node 321 or core network node 322 via a tunnel (e.g., the tunnel represented by 22 in FIG. 3) through intervening aggregation network nodes 231-232. The tunnel 22 can be configured to pass data packets and/or control packets. Access points 351-352 are configured to transmit wireless traffic to core network node 321 or core network node 322 via a tunnel (e.g., a tunnel represented by 20 in FIG. 3) through intervening access network nodes and aggregation network nodes. The tunnel 20 can be configured to pass data packets and/or control packets.

In a homogeneous enterprise network 300, the tunneling technology applied between a core network node 321 and/or 322 and an access device (e.g., an access network node 341-344, an access point 351-352) depends on the nature and/or capabilities of the core network node, the access device, and the intermediate network device(s) (e.g., aggregation network node 331 and/or 332) present between the core network node and the access device. In a homogeneous enterprise network (e.g., homogeneous enterprise network 300), a tunneling protocol such as a multiprotocol label switching (MPLS) tunnel or an Ethernet-over-layer-3 tunnel (such as a CAPWAP tunnel) can be used for tunneling data and/or control packets between a core network node and an access device.

Homogeneous enterprise networks such as network 300 in FIG. 3 can implement centralized core architectures. As described in detail herein, core network nodes of the homogeneous enterprise network 300 can provide a single point of configuration and management for all network services as well as a single logic point of interaction for authentication, visibility and monitoring applications. As a result, various types of service modules can be aggregated and/or consolidated at one or more core network nodes 321-322, such as firewall, intrusion detection policy (IDP), virtual private network (VPN) termination, and/or load balancing, etc. In such a homogeneous enterprise network 300, services no longer need to be distributed at various levels in the network, and users can be given consistent policy that is independent of their access mechanism.

In some embodiments, because network 300 provides a single point of configuration and management, Dynamic Host Configuration Protocol (DHCP) and Address Resolution Protocol (ARP) requests need not be broadcast to each node in the network 300. More specifically, such requests can be sent to the core network node 321 or 322 via a tunnel (e.g., a CAPWAP tunnel). Details associated with homogeneous networks reducing broadcast signals are shown and described in U.S. patent application Ser. No. 13/252,857 filed on Oct. 4, 2011, and entitled "Methods and Apparatus for a Scalable Network with Efficient Link Utilization", the disclosure of which is incorporated herein by reference in its entirety.

Moreover, the core network nodes of the homogenous enterprise network can also provide a single point of session management so that client devices (e.g., wired client devices such as wired client device 381 in FIG. 3, and wireless client devices such as wireless client device 391 in FIG. 3) are authenticated upon entry into the homogenous enterprise network 300. As discussed herein, tunneled traffic (such as data packets and/or control packets such as CAPWAP control packets), regardless of its origin, passes through the core network node(s) 321-322 including for example, tunneled traffic from client devices 381, 391 that is directed through a core network node 321 or 322 by the respective access network node 341-344 (for a wired client device) and access point 351-352 (for a wireless client device). Because such tunneled traffic passes through the core network nodes 321-322, the core network nodes 321-322 that include the (CAPWAP) control module(s) or CAPWAP controller(s) (as discussed in FIGS. 1 and 2) can perform authentication services as the client devices 381, 391 enter the homogenous enterprise network (such as those described in detail in 258-262 of the method in FIG. 2). The authentication of client devices 381, 391 allows the core network nodes 321-322 to establish the location of each of these client devices 381, 391 and their associated MAC address. Thus, no unknown MAC addresses exist within the homogenous enterprise network and no need exists for flooding related to MAC addresses.

Figure 4:
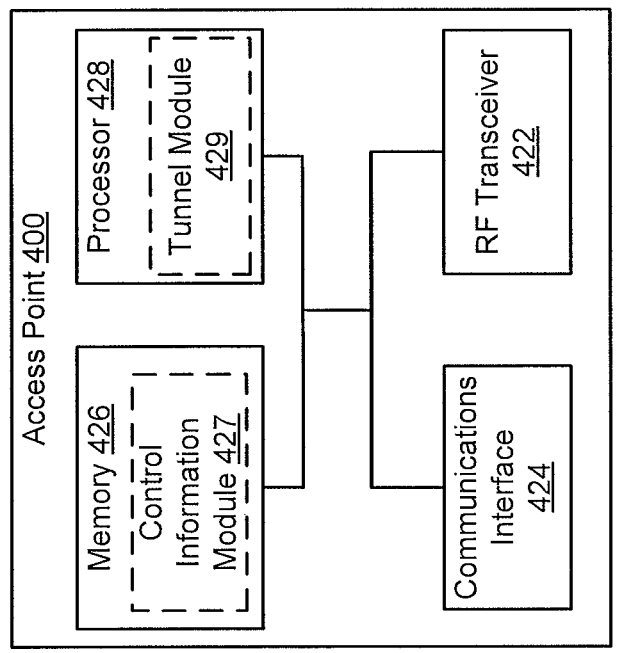
FIG. 4 is a system block diagram of an access point, according to an embodiment.

FIG. 4 is a system block diagram of an access point 400, according to an embodiment. Similar to access point 351 and access point 352 in the homogeneous enterprise network 300 shown in FIG. 3, access point 400 can be any device that connects one or more wireless client devices to an enterprise network (e.g., via an access network node) using for example, Wi-Fi, Bluetooth or other wireless communication standards. For example, access point 400 can be a wireless access point (WAP). As shown in FIG. 4, access point 400 includes a radio frequency (RF) transceiver 422, a communications interface 424, a memory 426 that contains a control information module 427, and a processor 428 that contains a tunnel module 429. Each component of access point 400 is operatively coupled to the other components of access point 400. Furthermore, the operations of the RF transceiver 422 (e.g., transmit/receive data), the communications interface 424 (e.g., transmit/receive data), tunnel module 429 (e.g., encapsulate/decapsulate control and/or data packets), as well as the manipulations on memory 426, are controlled by the processor 428. The processor 428 can be, for example, a general purpose processor, a Field Programmable Gate Array (FPGA), an Application Specific Integrated Circuit (ASIC), a Digital Signal Processor (DSP), and/or the like. The processor 428 can be configured to run and/or execute application processes and/or other modules, processes and/or functions associated with the access point 400. The processor 428 includes a tunnel module 429 that can execute application processes and/or other modules, processes and/or functions associated establishing and maintaining a tunnel (e.g., an Ethernet-over-layer-3 tunnel such as CAPWAP, a MPLS tunnel, etc.) as described in greater detail herein. For example, the tunnel module 429 can be responsible for and co-ordinate the encapsulation and decapsulation of incoming and/or outgoing control packets and data packets via the tunnel.

Access point 400 can communicate with a wireless client device (e.g., a Wi-Fi enabled laptop, a mobile phone) using, for example, any suitable wireless communication standard such as, for example, Wi-Fi, Bluetooth, and/or the like. Specifically, access point 400 can be configured to receive data and/or send data through RF transceiver 422, when communicating with a wireless client device. Furthermore, in some embodiments, an access point 400 of an enterprise network can use a first wireless communication standard to wirelessly communicate with a first wireless client device operatively coupled to the access point 400, while the second access point 400 can use a second wireless communication standard to wirelessly communicate with a second wireless client device operatively coupled to the access point 400. For example, as shown in FIGS. 3 and 4, access point 351 can send data or control packets through its RF transceiver to wireless host device 391 (e.g., a Wi-Fi enabled laptop) based on the Wi-Fi standard; while access point 351 can send data or control packets from its RF transceiver to another wireless client device (e.g., a Bluetooth-enabled mobile phone) (not shown in FIG. 3) based on the Bluetooth standard.

In some instances, access point 400 can be operatively coupled to an access network node by implementing a wired connection between communications interface 424 of the access point 400 and the communications interface of the access network node. The wired connection can be, for example, twisted-pair electrical signaling via electrical cables, fiber-optic signaling via fiber-optic cables, and/or the like. As such, access point 400 can be configured to receive data and control packets and/or send data and control packets through communications interface 424, which is connected with the communications interface of an access network node, when access point 400 is communicating with the access network node. Furthermore, in some instances, a first access point of an enterprise network can implement a wired connection with a first access network node operatively coupled to the first access point, while a second access point of the enterprise network can implement a different wired connection with a second access network node operatively coupled to the second access point. For example, as shown in FIG. 3, access point 351 can implement one wired connection such as twisted-pair electrical signaling to connect with access network node 341, while access point 352 can implement a different wired connection such as fiber-optic signaling to connect with access network node 344.

As described with respect to FIG. 3, access point 400 can be configured to prepare a packet (e.g., a data packet, a control packet) received from a wireless client device (such as the wireless client device 391 in FIG. 3) operatively coupled to access point 400, and send the packet to another network device such as a core network node via a tunnel (e.g., an Ethernet-over-layer-3 (CAPWAP) tunnel, a MPLS tunnel). Access point 400 can also be configured to decapsulate a packet received via a tunnel from another network device such as a core network node (321 or 322 in FIG. 3), before forwarding the decapsulated packet to a wireless client device operatively coupled to access point 400.

Specifically, upon receiving a (data or control) packet from a wireless client device operatively coupled to access point 400, the tunnel module 429 is configured to encapsulate the packet (e.g., add a header portion, a footer portion, and/or modify any other identifiers included within the packet) according to a specific tunneling protocol. The encapsulated packet is then sent through communications interface 424 to an access network node connected to access point 400, from which the encapsulated packet is forwarded along the tunnel to a network device at the end of the tunnel. On the other hand, upon receiving a (data or control) packet from an access network node connected to access point 400 that is sent through a tunnel from a network device, tunnel module 429 is configured to decapsulate the packet (e.g., remove a header portion, a footer portion, and/or modify any other identifiers included within the packet) according to a specific tunneling protocol. The decapsulated packet is then sent by RF transceiver 422 to a wireless client device operatively coupled to access point 400.

As described with respect to FIG. 3, when the network device (e.g., a core network node) at the end of the tunnel and all the intervening wired network nodes (e.g., access network nodes, aggregation network nodes) are within a homogeneous enterprise network or a homogeneous portion of a heterogeneous enterprise network, tunnel module 429 can be configured to encapsulate or decapsulate a packet according to a tunneling protocol such as an MPLS or an Ethernet-over-layer-3 (CAPWAP) tunneling protocol. As such, access point 400 can be configured to send a packet to and/or receive a packet from a core network node via the tunnel through intervening wired network nodes.

The memory 426 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 426 can store instructions to cause the processor 428 to execute modules, processes and/or functions associated with the access point 400. The memory 426 includes a control information module 427. The control information module 427 can be a hardware module or software module (stored in memory 426 and executed in processor 428) that can store data related to control and operation of the access point 400. In some embodiments, the control information module 427 can include CAPWAP specific information such as, for example, discovery information, configuration status information, and/or the like.

In some instances, for example, MAC addresses of potential user communication devices (client devices) can be stored in the control information module 427, such that a user communication device (client device) can be recognized by access point 400 upon being operatively coupled to access point 400. In another example, information associated with tunneling packets to a core network node can be stored in the control information module 427, such that establishing a tunnel with the core network node can be initialized by access point 400. In yet another example, an up-link policy table (not shown in FIG. 4) can be stored in the control information module 427, such that one or more up-link policies associated with a user can be downloaded to and enforced at access point 400 when the user is operatively coupled to access point 400 using a wireless client device.

In another example, the control information module 427 can contain a routing table (not shown in FIG. 4) that can list the routes to particular network destinations for incoming and/or outgoing control packets and data packets. The routing table can also store route information (such as IP or MAC addresses of network nodes, and/or devices, and/or interfaces) on directly connected and remote networks. Additionally, the routing table can also contain "next hop" associations indicating an intermediate destination along a specified path to the destination device or network node.

Figure 5:
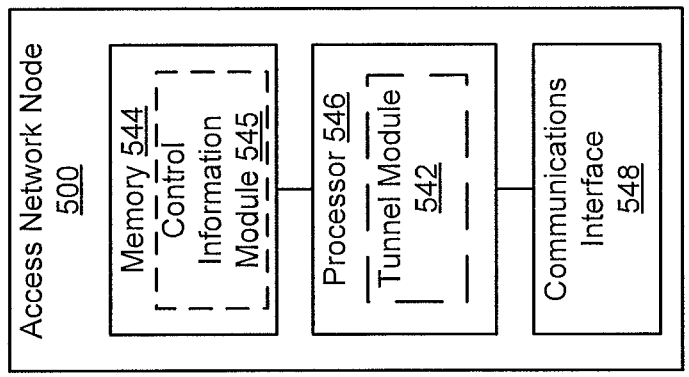
FIG. 5 is a system block diagram of an access network node, according to an embodiment.

FIG. 5 is a system block diagram of an access network node 500, according to an embodiment. Similar to access network node 341-344 in the homogeneous enterprise network 300 shown in FIG. 3, access network node 500 can be any device that connects one or more wired client devices to a homogeneous enterprise network. The access network node 500 can be, for example, an Ethernet switch, and/or the like. More specifically, access network node 500 is configured to ensure packets are transmitted between one or more aggregation network nodes, wired client devices, and/or access points that are operatively coupled to access network node 500. As shown in FIG. 5, access network node 500 includes communications interface 548, a memory 544 that includes a control information module 545, and a processor 546 that includes a tunnel module 542. Each component of the access network node 500 is operatively coupled to the other components of access network node 500. Furthermore, the operations of communications interface 548 (e.g., transmit/receive data), tunnel module 542 (e.g., encapsulate/decapsulate packets), as well as the manipulations on the memory 544 (e.g., update a policy table), are controlled by the processor 546. Similar to the case of the access point 400 (FIG. 4), the processor 546 of the access network node 500 can be, for example, a general purpose processor, a Field Programmable Gate Array (FPGA), an Application Specific Integrated Circuit (ASIC), a Digital Signal Processor (DSP), and/or the like. The processor 546 is operatively coupled with the memory 544 and can be configured to run and/or execute processes, and/or other modules, and/or functions associated with the access network node 500. The processor 546 includes a tunnel module 542 that can execute application processes and/or other modules, processes and/or functions associated establishing and maintaining a tunnel (e.g., an Ethernet-over-layer-3 (CAPWAP) tunnel, a MPLS tunnel) as described in greater detail herein.

The communications interface 548 of access network node 500 can include, for example, at least two ports (not shown in FIG. 5) that can be used to implement one or more wired connections between access network node 500 and one or more access points, wired client devices, and/or aggregation network nodes. The wired connection can be, for example, twisted-pair electrical signaling via electrical cables, fiber-optic signaling via fiber-optic cables, and/or the like. As such, access network node 500 can be configured to receive data and/or send data through one or more ports of communications interface 548, which are connected to the communications interfaces of one or more access points, wired host devices, and/or aggregation network nodes. Furthermore, in some embodiments, access network node 500 can implement a wired connection with one of an access point, a wired client device, or an aggregation network node that is operatively coupled to access network node 500 through one port of the communications interface 548. The access network node 500 can also implement a different wired connection with another access point, wired client device, or aggregation network node that is operatively coupled to access network node 400 through another port of communications interface 548. For example, as shown in FIG. 3, access network node 341 can implement one wired connection such as twisted-pair electrical signaling to connect with access point 351, while implementing a different wired connection such as fiber-optic signaling to connect with aggregation network node 331.

Similar to the description of FIG. 3 and FIG. 4, access network node 500 can be one of the intervening wired network nodes between an access point and a core network node, through which a tunnel is established between the access point and the core network node. In such embodiments, access network node 500 can be configured to forward a tunneled (data and/or control) packet. For example, similar to access network node 341 shown in FIG. 3, access network node 500 can forward a tunneled packet encapsulated according to, for example, an Ethernet-over-layer-3 tunneling protocol (CAPWAP protocol), which is received from an access point, to the core network node via an Ethernet-over-layer-3 tunnel (CAPWAP Tunnel) (shown as the tunnel represented by 20 in FIG. 3) connecting access point and core network node.

Similar to the description of FIG. 3, access network node 500 can be configured to prepare a packet (e.g., a data packet, a control packet) received from a wired client device directly or operatively coupled to access network node 500, and send the packet to another network device such as a core network node via a tunnel. Access network node 500 can also be configured to decapsulate a packet received via a tunnel from another network device such as a core network node, before forwarding the decapsulated packet to a wired client device directly or operatively coupled to access network node 500. The tunnel module 542 located in the processor 546 of the access network node performs the data or control packet encapsulation and decapsulation. Specifically, upon receiving a packet from a wired client device operatively coupled to access network node 500, tunnel module 542 is configured to encapsulate the packet (e.g., add a header portion, a footer portion, and/or modify any other identifiers included within the packet) according to the protocol of the tunnel. The encapsulated packet is then sent through a port of the communications interface 548 to an aggregation network node connected to access network node 500, from which the encapsulated packet is forwarded along the tunnel to a core network node. On the other hand, upon receiving a packet from an aggregation network node connected to access network node 500 that is sent through a tunnel from a core network node, the tunnel module 542 is configured to decapsulate the packet (e.g., remove a header portion, a footer portion, and/or modify any other identifiers included within the packet) according to the protocol of the tunnel. The decapsulated packet is then sent through a port of communications interface 548 to a wired client device operatively coupled to access network node 500.

The memory 544 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 544 can store instructions to cause the processor 546 to execute modules, processes and/or functions associated with the access network node 500. The memory 544 includes a control information module 545. The control information module 545 can be a hardware module or software module (stored in memory 544 and executed in processor 546) that can store data related to the control and operation of the access network node 500.

In some embodiments, for example, the MAC addresses of potential user communication devices (client devices) can be stored in the control information module 545, such that a user communication device (client device) can be recognized by access network node 500 upon being operatively coupled to the access network node 500. In some instances, information associated with tunneling packets to a core network node can be stored in the control information module 545, such that establishing a tunnel such as a MPLS tunnel or a layer-3 tunnel with the core network node can be initialized by access network node 500. In yet another instances, an up-link policy table (not shown in FIG. 5) can be stored in the control information module 545, such that one or more up-link policies associated with a user can be downloaded to and enforced at access network node 500 when the user is operatively coupled to access network node 500 using a wired client device.

In another example, the control information module 545 can contain a routing table (not shown in FIG. 5) that can list the routes to particular network destinations for incoming and/or outgoing control packets and data packets. The routing table can also store route information (such as IP or MAC addresses of network nodes, devices and/or interfaces) on directly connected and remote networks. Additionally, the routing table can also contain "next hop" associations indicating an intermediate destination along an optimal path to the destination device or a network node.

FIG. 6 is a system block diagram of a core network node 600, according to an embodiment. Similar to core network node 321 and core network node 322 in the homogeneous enterprise network 300 shown in FIG. 3, core network node 600 can be, for example, any switching device positioned in the physical core or backbone of an enterprise network and configured to operatively couple the remaining devices (e.g., aggregation network nodes, access network nodes, access points) of the enterprise network to one or more devices of the enterprise network and other networks that provide access to data resources and/or information services. More specifically, core network node 600 is configured, for example, to forward data between one or more aggregation network nodes and one or more other networks that are operatively coupled to core network node 600, based on IP routing services. Furthermore, core network node 600 is configured, for example, to manage both wired and wireless network devices, manage user sessions for both wired and wireless clients, and retrieve control information associated with request signals received from wired and wireless host devices, as described in detail herein. This is because the control module 624 that is responsible for implementing different protocols for session management, node management, route management, and data tunneling function for both wired and wireless devices is located in the core network node 600.

As shown in FIG. 6, core network node 600 includes a communications interface 630, a memory 610 that contains the control information module 612, and a processor 620 that contains the tunnel module 622 and the control module 624. Operations of the communications interface 630 (e.g., transmit/receive data and control packets), the tunnel module 622 (e.g., encapsulate/decapsulate data and control packets), and the control module 624 (e.g., manage a user session), as well as manipulations on the control information module 612 (e.g., update control information, add new control instructions, etc.) or any other portion of the memory 610, can be controlled by the processor 620.

The processor 620 of the core network node 600 can be, for example, a general purpose processor, a Field Programmable Gate Array (FPGA), an Application Specific Integrated Circuit (ASIC), a Digital Signal Processor (DSP), and/or the like. The processor 620 is configured to run and/or execute processes, and/or other modules, and/or functions associated with the core network node 600. The processor 620 includes a tunnel module 622 and a control module 624. The tunnel module 622 can execute application processes and/or other modules, processes and/or functions associated establishing and maintaining a tunnel (e.g., an Ethernet-over-layer-3 (CAPWAP) tunnel, a MPLS tunnel, etc.) as described in greater detail herein. The control module 624 can implement the different protocols for session management, node management, and data tunneling function for both wired and wireless devices located in an enterprise network as described in greater detail herein.

In some embodiments, the communications interface 630 of core network node 600 can include at least two ports (not shown in FIG. 6) that can be used to implement one or more wired connections between the core network node 600 and one or more aggregation network nodes, one or more access network nodes, other core network nodes, and/or devices in other networks. The wired connections can be, for example, twisted-pair electrical signaling via electrical cables, fiber-optic signaling via fiber-optic cables, and/or the like. As such, core network node 600 can be configured to receive data and control packets and/or send data and control packets through one or more ports of the communications interface 630, which are connected with the communications interfaces of one or more aggregation network nodes, one or more access network nodes, other core network nodes, and/or devices in other networks. Furthermore, in some embodiments, core network node 600 can implement one wired connection with one of an aggregation network node, an access network node, another core network node, or a device in another network that is operatively coupled to core network node 600 through one port of communications interface 630, while implementing a different wired connection with another aggregation network node, access network node, core network node, or a device in another network that is operatively coupled to core network node 600 through another port of communications interface 630. For example, core network node 600 can implement one wired connection such as twisted-pair electrical signaling to connect with an aggregation network node, and a core network node, while implementing a different wired connection such as fiber-optic signaling to connect with a device in the network.

Similar to the discussion with respect to FIG. 3, core network node 600 can be configured to prepare a packet (e.g., a data packet, a control packet) to be sent to an access device (e.g., an access point, an access network node) via a tunnel. Core network node 600 can also be configured to receive and decapsulate an encapsulated packet from an access device via a tunnel. Core network node 600 can be configured to forward packets to and/or receive packets from other network devices that are operatively coupled to core network node 600, including other core network nodes and/or devices in other networks, without using any tunneling technology. Additionally, the control module 624 of the core network node 600 can be configured to manage both wired and wireless user sessions for one or more users and/or for one or more wired and/or wireless client devices.

More specifically, in some instances, upon receiving a data or control packet associated with a user session at a port of the communications interface 630 via a tunnel (such as an Ethernet-over-layer-3 tunnel or a MPLS tunnel), the tunnel module 622 can be configured to decapsulate the packet (e.g., remove a header portion, a footer portion, and/or modify any other identifiers included within the packet) according to the protocol for that tunnel.

Alternatively, in other instances, core network node 600 can receive a control or data packet associated with a user session at a port of the communications interface 630 from another network device that is operatively coupled to core network node 600, such as another core network node or a device in another network (for example, a device in network 301 in FIG. 3). To forward the received control or data packet to the intended destination, the control module 624 can be configured to look up the destination IP address included in the packet. In some embodiments, a collection of aggregation network nodes and associated access devices (e.g., access network nodes, access points) having a common connection to a set of core network nodes are referred to as a pod. For example, as shown in FIG. 3, aggregation network nodes 331 with the associated access network nodes 341-343 and access point 351 comprise a pod.

If the received control or data packet is not destined to a user in a pod that is directly connected to core network node 600 (e.g., destined to a network device in a pod that is not connected to core network node 600, or destined to a user in another network), control module 624 can forward the control or data packet, from a port of communications interface 630, to a network device that is operatively coupled to core network node 600, such as another core network node or a device in another network, without using any tunneling technology. If the packet is destined to a user in a pod that is directly connected to core network node 600, the tunnel module 622 can encapsulate the packet (e.g., add a header portion, a footer portion, and/or modify any other identifiers included within the packet) according to the specific tunnel protocol. Meanwhile, control module 624 can establish a tunnel such as, for example, an Ethernet-over-layer-3 tunnel (e.g., CAPWAP tunnel) or a MPLS tunnel connecting core network node 600 to the access device (e.g., an access network node, an access point) that is operatively coupled to the client device (if such a tunnel is not established yet). Finally, control module 624 can send the encapsulated packet, from a port of communications interface 630, to the access device through the tunnel.

The memory 610 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 610 can store instructions to cause the processor 620 to execute modules, processes and/or functions associated with the core network node 600 and/or the enterprise network. The memory 610 includes a control information module 612. The control information module 612 can be a hardware module or software module (stored in memory 610 and executed in processor 620) that can store data related to the control and operation of the core network node 600.

As described with respect to FIG. 3 and shown in FIG. 6, control information associated with one or more types of request signals can be stored in the control information module 612. In some instances, for example, information associated with tunneling data and/or control packets to one or more access devices can be stored in control information module 612, such that establishing a tunnel with one or multiple access devices can be initialized by core network node 600. The control information module 612 can include additional control information such as, for example, a list of the CAPWAP binding protocols supported by the control module 600, the control module 600 state information, the addresses of interfaces running the CAPWAP Control Internet Protocol version 4 (IPv4), the addresses of interfaces running the CAPWAP Control Internet Protocol version 6 (IPv6), the policy on the use of DTLS for CAPWAP control channels, the CAPWAP timer element, the access network node fall back element, and/or so forth.

In some instances, data other than control information can be stored in the memory 610. For example, combinations of user IDs and passwords of potential users can be stored in memory 610, such that the identification of a user can be verified by core network node 600 upon a user ID and a password being provided to core network node 600. Alternatively, the memory 610 can store address information for an external server that stores user authentication information (e.g., user IDs and passwords) and related policy.

Figure 7:
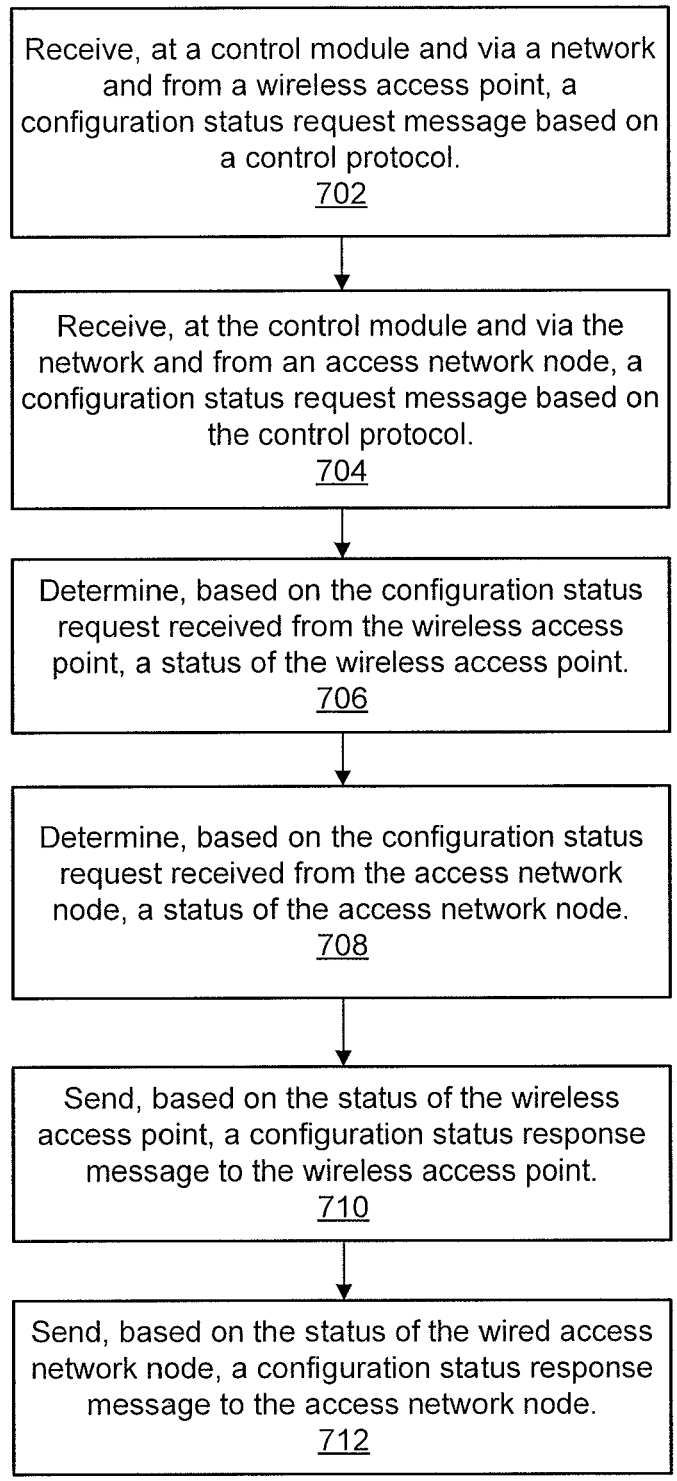
FIG. 7 is a flow chart of a method for receiving configuration status request messages at a control module and sending configuration status response messages from the control module, according to an embodiment.

FIG. 7 is a flow chart of a method for receiving configuration status request messages at a control module and sending configuration status response messages from the control module, according to an embodiment. The control module discussed in the method of FIG. 7 can be, for example, similar to the control module 624 in FIG. 6, the control module 240 in FIG. 2, and/or so forth.

The method 700 includes receiving at a control module and via a network and from a wireless access point, a configuration status request message based on a control protocol, at 702. As discussed above, the configuration status request message can be sent by a wireless access point to deliver its current configuration status information to the control module and can carry control protocol specific information (e.g., information related on the CAPWAP protocol bindings for wireless devices). The configuration status request message can also include, for example, the port identifier associated with a port of the wireless access point that is operatively coupled to the control module, an indication of a port speed of the port, an indication of the number of wireless client devices currently connected to the wireless access point, the number of free ports available to connect to a new wireless device, the state of the RF transceiver of the wireless access point, the control module name, a list of the different control transport protocol(s) supported by the wireless access point, and/or so forth.

At 704, a configuration status request message is received at a control module and via a network and from an access network node based on a control protocol. The configuration status request message defined by the access network node can contain for example, an indication of a power-over-Ethernet capability of the port connected to the wired client device, in addition to the portions of the configuration status request message that have been discussed above at 702 for the case of the wireless access point.

At 706, a status of the wireless access point is determined based on the configuration status request message received from the wireless access point. The control module can determine the status of the wireless access point based on the information contained in the configuration status request message such as, for example, the number of ports in the wireless access points available to connect to new wireless devices, the particular control protocol supported by the wireless access point, the speed of the port operatively coupled to the control module, and/or so forth.

At 708, a status of the access network node is determined based on the configuration status request message received from the access network node. This determination is performed according to a method that is similar to the case of the wireless access point as described above at 706.

At 710, a configuration status response message is sent to the wireless access point based on the status of the wireless access point. The configuration status response message is sent by the control module after receiving the configuration status request message. The configuration status response message can carry specific information related to the control protocol (e.g., CAPWAP protocol bindings for wireless devices). In some embodiments, the configuration status response message can comprise multiple portions (components) such as, for example, a CAPWAP timer information, the access network node fall back information, the control module IPv4 list, the control module 240 IPv6 list, and/or so forth as described above. The configuration status response message, in some instances, can provide a mechanism for the control module to override a wireless access point's requested configuration. For example, the configuration status response message can include a radio operational state message portion that can cause a change in the operational state of one or more of the RF transceivers associated with the wireless access point.

At 712, a configuration status response message is sent to the access network node based on the status of the access network node. The configuration status response message is sent by the control module after receiving the configuration status request message. The configuration status response message is sent by the control module and, in some instances, can provide a mechanism for the control module to override an access network node's requested configuration. In some embodiments, the configuration status response message to the access network node can also comprise multiple portions (components) similar to those discussed above at 710.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
   a control module implemented in at least one of a memory or a processing device, the control module configured to receive, via a network and from a wireless access point that operatively couples a first client device to the network via a wireless link, a control packet defined based on a control protocol and associated with at least one control function of the wireless access point,
   the control module configured to receive, via the network and from an access network node that operatively couples a second client device to the network via a wired link, a control packet defined based on the control protocol and associated with at least one control function of the access network node,
   the control module configured to extract, from the control packet from the access network node, a configuration status of the access network node, the control module configured to send, via the network, a response to the access network node based on the configuration status of the access network node, and
   the control module configured to exchange a data packet between the wireless access point and the access network node via a common data tunnel, the common data tunnel configured to operate according to the control protocol determined at least in part based on the control packet from the access network node, the common data tunnel including the wireless access point, the control module and the access network node.

2. The apparatus of claim 1, wherein the at least one control function of the access network node includes at least one of a node management function, a session management function, or a route management function.

3. The apparatus of claim 1, wherein the control module is configured to determine a configuration status of the wireless access point based on the control packet from the wireless access point, the control module configured to send, via the network, a response to the wireless access point based on the configuration status of the wireless access point.

4. The apparatus of claim 1, wherein the control module is a Control And Provisioning of Wireless Access Points (CAPWAP) access controller (AC).

5. The apparatus of claim 1, wherein the control protocol is a Control And Provisioning of Wireless Access Points (CAPWAP) protocol.

6. The apparatus of claim 1, wherein the control packet from the wireless access point is defined based on a first Control And Provisioning of Wireless Access Points (CAPWAP) protocol binding,
   the control packet from the access network node is defined based on a second CAPWAP protocol binding different than the first CAPWAP protocol binding.

7. The apparatus of claim 1, wherein the control module is configured to receive the control packet from the access network node via a control channel between the control module and the access network node.

8. The apparatus of claim 1, wherein the control module is configured to receive the control packet from the access network node such that the control packet from the access network node is an authentication request associated with the second client device,
   the control module configured to authenticate the second client device based on the control packet from the access network node, the control module configured to send the response in response to authenticating the second client device such that the access network node implements a policy associated with the second client device.

9. The apparatus of claim 1, wherein the control module is configured to receive the control packet from the access network node such that the control packet from the access network node includes information associated with a port of the access network node via which the second client device is operatively coupled to the network.

10. The apparatus of claim 1, wherein the control module is configured to receive the control packet from the access network node such that the control packet from the access network node is a Control And Provisioning of Wireless Access Points (CAPWAP) protocol discovery request message, the response being a CAPWAP protocol discovery response message.

11. The apparatus of claim 1, wherein the control module is configured to receive the control packet from the access network node such that the control packet from the access network node is a Control And Provisioning of Wireless Access Points (CAPWAP) protocol configuration status request message.

12. A non-transitory processor-readable medium storing code representing instructions to be executed by a processor, the code comprising code to cause the processor to:
receive, at a control module and via a network and from a wireless access point, a configuration status request message defined based on a control protocol;
receive, at the control module and via the network and from an access network node, a configuration status request message defined based on the control protocol;
extract, from the configuration status request received from the wireless access point, a configuration status of the wireless access point;
determine, based on the configuration status request received from the access network node, a configuration status of the access network node;
send, from the control module and based on the configuration status of the wireless access point, a configuration status response message to the wireless access point;
send, from the control module and based on the configuration status of the access network node, a configuration status response message to the access network node; and
exchange a data packet between the wireless access point and the access network node via a common data tunnel, the common data tunnel configured to operate according to the control protocol determined at least in part based on the configuration status of the access network node, the common data tunnel including the wireless access point, the control module and the access network node.

13. The non-transitory processor-readable medium of claim 12, wherein the control protocol is a Control And Provisioning of Wireless Access Points (CAPWAP) protocol.

14. The non-transitory processor-readable medium of claim 12, wherein the configuration status request message received from the access network node is a Control And Provisioning of Wireless Access Points (CAPWAP) protocol configuration status request message.

15. The non-transitory processor-readable medium of claim 12, wherein the configuration status request message received from the access network node includes at least one of a port identifier associated with a port of the access network node, an indication of a port speed of the port, or an indication of a power-over-Ethernet capability of the port.

16. The non-transitory processor-readable medium of claim 12, wherein the control protocol is a Control And Provisioning of Wireless Access Points (CAPWAP) protocol, the configuration status request message received from the access network node is defined based on a CAPWAP binding for wired devices.

17. The non-transitory processor-readable medium of claim 12, wherein the configuration status request message is received from the access network node via a control channel between the control module and the access network node.

18. An apparatus, comprising:
an access network node configured to operatively couple a client device to a network via a wired link, the access network node configured to send a Control And Provisioning of Wireless Access Points (CAPWAP) protocol discovery request message to a CAPWAP control module via the network, the CAPWAP protocol discovery message including a configuration status of the access network node, the access network node configured to receive, from the CAPWAP control module and in response to the CAPWAP protocol discovery request message, a CAPWAP discovery response message including a service-and-capability advertisement,
the access network node configured to establish, in response to the CAPWAP discovery response message, a control channel with the CAPWAP control module, and
the access network node configured to establish, in response to the CAPWAP discovery response message, a data tunnel between the access network node and the CAPWAP control module, the data tunnel configured based at least on a frame tunneling mode indicated in the CAPWAP protocol discovery message.

19. The apparatus of claim 18, wherein the access network node is configured to send the CAPWAP protocol discovery request message to the CAPWAP control module as a User Datagram Protocol (UDP) packet.

20. The apparatus of claim 18, wherein the CAPWAP protocol discovery request message is associated with a CAPWAP binding for wired devices.

21. The apparatus of claim 18, wherein the CAPWAP protocol discovery request message includes information associated with a port of the access network node via which the client device is operatively coupled to the network.

22. The apparatus of claim 18, wherein the CAPWAP protocol discovery request message includes an indicator associated with a power-over-Ethernet capability of a port of the access network node via which the client device is operatively coupled to the network.

* * * * *